(12) United States Patent
Wild et al.

(10) Patent No.: US 9,262,912 B2
(45) Date of Patent: *Feb. 16, 2016

(54) LOCALIZING TAGGED ASSETS USING MODULATED BACKSCATTER

(75) Inventors: Ben J. Wild, Sunnyvale, CA (US);
Artem Tkachenko, Fremont, CA (US);
Kannan Ramchandran, El Cerrito, CA (US); Upamanyu Madhow, Santa Barbara, CA (US)

(73) Assignee: CHECKPOINT SYSTEMS, INC., Thorofare, NJ (US)

(*) Notice: Subject to any disclaimer, the term of this patent is extended or adjusted under 35 U.S.C. 154(b) by 1124 days.

This patent is subject to a terminal disclaimer.

(21) Appl. No.: 12/072,423

(22) Filed: Feb. 25, 2008

(65) Prior Publication Data

US 2009/0212921 A1    Aug. 27, 2009

(51) Int. Cl.
*H04Q 5/22* (2006.01)
*G08C 21/00* (2006.01)
(Continued)

(52) U.S. Cl.
CPC . *G08C 21/00* (2013.01); *G01S 5/02* (2013.01);
*G01S 5/0252* (2013.01); *G01S 11/02* (2013.01);
*G01S 13/756* (2013.01); *G01S 13/876*
(2013.01)

(58) Field of Classification Search
CPC ....... G01S 5/02; G01S 5/0252; G01S 5/0257;
G01S 5/0278; G01S 5/0284; G01S 5/14;
G01S 5/00; G01S 5/0263; G01S 11/02;
G01S 1/028; G01S 1/02; G01S 5/0294;
G01S 15/06; G01S 7/527; G01S 7/539;
G06K 7/10376; G06K 7/10099; G06K
19/0723; G06K 2017/0045
USPC ......................... 340/10.1, 10.32, 10.4–10.42,
340/572.1–572.9, 539.11, 539.13, 8.1, 5.1,
340/5.9, 5.92; 342/450, 463
See application file for complete search history.

(56) References Cited

U.S. PATENT DOCUMENTS 4,224,472 A    9/1980   Zarount
4,688,026 A *  8/1987   Scribner et al. ............... 235/385
(Continued)

FOREIGN PATENT DOCUMENTS

EP         1610258 A1     12/2005
JP         2002271229     9/2002
(Continued)

OTHER PUBLICATIONS

Bernard Widrow and John M. McCool, "A Comparison of Adaptive Algorithms Based on the Methods of Steepest Descent and Random Search," IEEE Transactions on Antennas and Propagation, vol. 24, No. 5, pp. 615-637 (Sep. 1976).

(Continued)

*Primary Examiner* — Steven Lim
*Assistant Examiner* — Ryan Sherwin
(74) *Attorney, Agent, or Firm* — Nelson Mullins Riley & Scarborough LLP

(57) ABSTRACT

Methods and systems for localizing an asset using the modulated backscatter from an asset tag and one or more marker tags are described. The system includes the reader, a location module and one or more marker tags. The location estimates for the asset tag are based partially on a prior knowledge of the location of each of the one or more marker tags. The location for each marker tag may be stored in a database. The location module determines a location estimate for the asset tag using the estimated parameters of the modulated backscatter signals received from one or more marker tags and from the asset tag. Using the known locations of the marker tags, a location estimate of the asset tag can be determined. The location estimate may be a relative location, an absolute location, and/or may be a zone including the marker tags. A mobile reader using the marker tags can localize asset tags throughout a large area and may, for example, take an inventory of assets throughout the large area.

14 Claims, 7 Drawing Sheets

(51) Int. Cl.
*G01S 11/02* (2010.01)
*G01S 5/02* (2010.01)
*G01S 13/75* (2006.01)
*G01S 13/87* (2006.01)

(56) References Cited

U.S. PATENT DOCUMENTS

| | | | |
|---|---|---|---|
| 5,227,803 A | | 7/1993 | O'Connor et al. |
| 5,583,517 A * | | 12/1996 | Yokev et al. ............... 342/457 |
| 5,649,295 A | | 7/1997 | Shober et al. |
| 5,924,020 A * | | 7/1999 | Forssen et al. ............... 455/129 |
| 6,046,683 A * | | 4/2000 | Pidwerbetsky et al. ...... 340/10.4 |
| 6,380,894 B1 | | 4/2002 | Boyd et al. |
| 6,486,769 B1 | | 11/2002 | McLean |
| 6,577,238 B1 * | | 6/2003 | Whitesmith et al. ........ 340/572.1 |
| 6,600,418 B2 * | | 7/2003 | Francis et al. .............. 340/572.1 |
| 6,882,315 B2 * | | 4/2005 | Richley et al. ................ 342/465 |
| 7,009,561 B2 | | 3/2006 | Menache et al. |
| 7,030,761 B2 | | 4/2006 | Bridgelall et al. |
| 7,084,740 B2 * | | 8/2006 | Bridgelall .................. 340/10.42 |
| 7,161,489 B2 | | 1/2007 | Sullivan et al. |
| 7,187,288 B2 | | 3/2007 | Mendolia et al. |
| 7,295,114 B1 | | 11/2007 | Drzaic et al. |
| 7,378,967 B2 | | 5/2008 | Sullivan et al. |
| 7,394,358 B2 * | | 7/2008 | Cherry .......................... 340/505 |
| 7,403,120 B2 | | 7/2008 | Duron et al. |
| 7,408,507 B1 * | | 8/2008 | Paek et al. ..................... 342/368 |
| 7,420,509 B2 * | | 9/2008 | Minkoff ........................ 342/379 |
| 7,508,306 B2 * | | 3/2009 | Fujii et al. .................. 340/572.1 |
| 7,679,561 B2 * | | 3/2010 | Elwell et al. ................. 342/453 |
| 7,812,719 B2 * | | 10/2010 | Djuric et al. ............. 340/539.13 |
| 7,904,244 B2 * | | 3/2011 | Sugla ............................ 701/300 |
| 8,284,027 B2 * | | 10/2012 | Taki et al. ..................... 340/10.1 |
| 8,364,164 B2 * | | 1/2013 | Phatak et al. ................. 455/456.1 |
| 8,624,707 B2 * | | 1/2014 | Konishi et al. ................. 340/8.1 |
| 2002/0019702 A1 | | 2/2002 | Nysen |
| 2002/0070862 A1 | | 6/2002 | Francis et al. |
| 2002/0145563 A1 | | 10/2002 | Kane et al. |
| 2003/0007473 A1 | | 1/2003 | Strong et al. |
| 2003/0117320 A1 * | | 6/2003 | Kim et al. ..................... 342/457 |
| 2005/0207617 A1 | | 9/2005 | Sarnoff |
| 2005/0237953 A1 | | 10/2005 | Carrender et al. |
| 2006/0022800 A1 | | 2/2006 | Krishna et al. |
| 2006/0022815 A1 | | 2/2006 | Fischer et al. |
| 2006/0033609 A1 | | 2/2006 | Bridgelall |
| 2006/0044147 A1 | | 3/2006 | Knox et al. |
| 2006/0232412 A1 | | 10/2006 | Tabacman et al. |
| 2006/0244588 A1 * | | 11/2006 | Hannah et al. ............ 340/539.13 |
| 2007/0279277 A1 * | | 12/2007 | Kuramoto et al. ............ 342/147 |
| 2007/0285245 A1 | | 12/2007 | Djuric et al. |
| 2007/0290802 A1 | | 12/2007 | Batra et al. |
| 2008/0012710 A1 | | 1/2008 | Sadr |
| 2008/0030422 A1 | | 2/2008 | Gevargiz et al. |
| 2008/0068265 A1 | | 3/2008 | Kalliola et al. |
| 2008/0100439 A1 | | 5/2008 | Rinkes |
| 2008/0109970 A1 | | 5/2008 | Hutton |
| 2008/0111693 A1 | | 5/2008 | Johnson et al. |
| 2008/0143482 A1 * | | 6/2008 | Shoarinejad et al. ........ 340/10.1 |
| 2008/0157972 A1 | | 7/2008 | Duron et al. |
| 2008/0191941 A1 * | | 8/2008 | Saban et al. .................. 342/450 |
| 2008/0242240 A1 | | 10/2008 | Rofougaran et al. |
| 2008/0266131 A1 | | 10/2008 | Richardson et al. |
| 2008/0311931 A1 | | 12/2008 | Venkatachalam et al. |
| 2008/0318632 A1 | | 12/2008 | Rofougaran et al. |
| 2010/0039929 A1 * | | 2/2010 | Cho et al. ...................... 370/216 |

FOREIGN PATENT DOCUMENTS

| | | |
|---|---|---|
| JP | 2003185730 | 7/2003 |
| JP | 2004354351 | 12/2004 |
| JP | 2006105723 | 4/2006 |
| JP | 2007508773 | 4/2007 |
| JP | 2007114003 | 5/2007 |
| JP | 2007170853 | 7/2007 |
| WO | 0106401 A1 | 1/2001 |
| WO | WO 2006/026518 A2 | 3/2006 |
| WO | WO 2006/099148 A1 | 9/2006 |

OTHER PUBLICATIONS

R. Mudumbai, J. Hespanha, U. Madhow, and G. Barriac, "Scalable Feedback Control for Distributed Beamforming in Sensor Networks," Proc. 2005 IEEE International Symposium on Information Theory (ISIT 2005), Adelaide, Australia (Sep. 2005).

"OMRON Develops World-First RFID Technology for Measuring the Distance Between UHF-Band Antenna and IC Tags," http://www.finanznachrichten.de/nachrichten-2007-09/artikel-8988010.asp. (Sep. 10, 2007).

International Search Report and Written Opinion for corresponding PCT Application No. PCT/US08/03438, dated Jun. 12, 2008.

* cited by examiner

LOCALIZING TAGGED ASSETS USING MODULATED BACKSCATTER

BACKGROUND

1. Field of the Invention

The present invention relates generally to asset tracking, and more particularly to localizing tagged assets using modulated backscatter.

2. Related Art

In a conventional radio frequency identification (RFID) system, data encoded in a tag is communicated by the tag to a reader in response to a query from the reader. A tag may be batteryless (i.e., a passive tag), in which case a transmitted beam from the reader energizes the tag's circuitry, and the tag then communicates data encoded in the tag to the reader using modulated backscatter. Since the tag is typically affixed to an asset (e.g., an item being tracked by the RFID system), the data encoded in the tag may be used to uniquely identify the asset.

In the case of a semi-passive tag, a battery included with the tag powers the tag's circuitry. When the tag detects the transmitted beam from the reader, the tag communicates data encoded in the tag to the reader using modulated backscatter. In the case of an active tag, a battery included with the tag may power the communication to the reader without first detecting or being energized by the transmit beam. Semi-passive tags and active tags may also include data encoded in the tag that may uniquely identify the asset.

In conventional RFID systems, the ability of the reader to determine the location of a tag may be limited because the reader typically transmits a beam with a broad pattern. Conventional RFID systems may employ a reader including one or more antennas, where each antenna has a fixed beam pattern. These antennas are typically separated by a spacing that is large compared to the transmitted beam's wavelength, in order to provide diversity against multi-path fading and to increase the reliability of receiving the communication from tags with unknown orientations. In addition, conventional RFID systems may be limited when the communication range between a single fixed reader and a tag is too small to read all tags in an area of interest.

SUMMARY

Embodiments of the invention include a method for receiving modulated backscatter signals using a reader from one or more marker tags, receiving a modulated backscatter signal using the reader from an asset tag, estimating parameters of the modulated backscatter signals received from the one or more marker tags and estimating a parameter of the modulated backscatter signal received from the asset tag. The method further includes determining a location estimate for the asset tag, the location estimate based on the estimated parameters of the modulated backscatter signals received from the one or more marker tags and the estimated parameter of the modulated backscatter signal received from the asset tag.

According to another embodiment, a method includes estimating first parameters of modulated backscatter signals received from a plurality of marker tags when a reader is at a first position, estimating a second parameter of a modulated backscatter signal received from an asset tag when the reader is at the first position, moving the reader to a second position, estimating third parameters of the modulated backscatter signals received from the plurality of marker tags when the reader is at the second position, and estimating a fourth parameter of the modulated backscatter signal received from the asset tag when the reader is at the second position. The method further includes estimating a location of the asset tag based on the first parameters, the second parameter, the third parameters and the fourth parameter.

Embodiments of the invention include means for receiving modulated backscatter signals from one or more marker tags, means for receiving a modulated backscatter signal from an asset tag, means for estimating parameters of the modulated backscatter signals received from the one or more marker tags, means for estimating a parameter of the modulated backscatter signal received from the asset tag and means for determining a location estimate for the asset tag, the location estimate based on the estimated parameters of the modulated backscatter signals received from the one or more marker tags and the estimated parameter of the modulated backscatter signal received from the asset tag.

BRIEF DESCRIPTION OF THE DRAWINGS

Elements in the figures are illustrated for simplicity and clarity and are not drawn to scale. The dimensions of some of the elements may be exaggerated relative to other elements to help improve the understanding of various embodiments of the invention.

DETAILED DESCRIPTION

The present invention includes methods and systems for localizing an asset using the modulated backscatter from an asset tag and one or more marker tags. The modulated backscattered signals from marker tags may be used by a reader and a location module to estimate location of the reader and the asset tags. An asset is any item whose location is of interest, and an asset tag is a tag associated with the asset, for example, by affixing the asset tag to the asset. Assets may be inanimate objects such as books, or persons, animals, and/or plants.

The methods and systems enable location-enabled inventory, where the estimated locations of tagged assets are determined in an area of interest. Furthermore, in embodiments including a mobile reader, the methods and systems can localize asset tags throughout a large area and can, for example, take an inventory of tagged assets throughout the large area.

The system includes the reader and the location module and one or more marker tags that are used to provide location estimates for the asset tag based partially on a prior knowledge of the location of each of the one or more marker tags. The location for each marker tag may be stored in a database. A location estimate for an asset tag may be determined based on the marker tags. Once the location of an asset tag is estimated, the asset tag may act as a marker tag, and is described herein as a simulated marker tag.

A location module determines a location estimate for the asset tag using the estimated parameters of the modulated backscatter signals received from one or more marker tags and from the asset tag. The parameters may be represented by scalar or vector values, and may include, for example, the angle of arrival of the modulated backscatter signals with respect to an axis of the reader, and/or a range (i.e., distance) from the marker tag and/or the asset tag to the reader. Using the known locations of the marker tags and the estimated parameters, the location estimate of the asset tag can be determined. A location estimate may be a relative location, an absolute location, and/or a zone including the marker tags.

In one example, a zone including an asset tag may be determined by marker tags at each end of a bookshelf. When the asset tag is affixed to an item on the bookshelf, such as a book, the book may thereby be determined to be in the zone, and likewise on the bookshelf. In this configuration, a relative location of the reader may also be determined by processing the received modulated backscatter signals from the asset tag and the marker tags.

Figure 1:
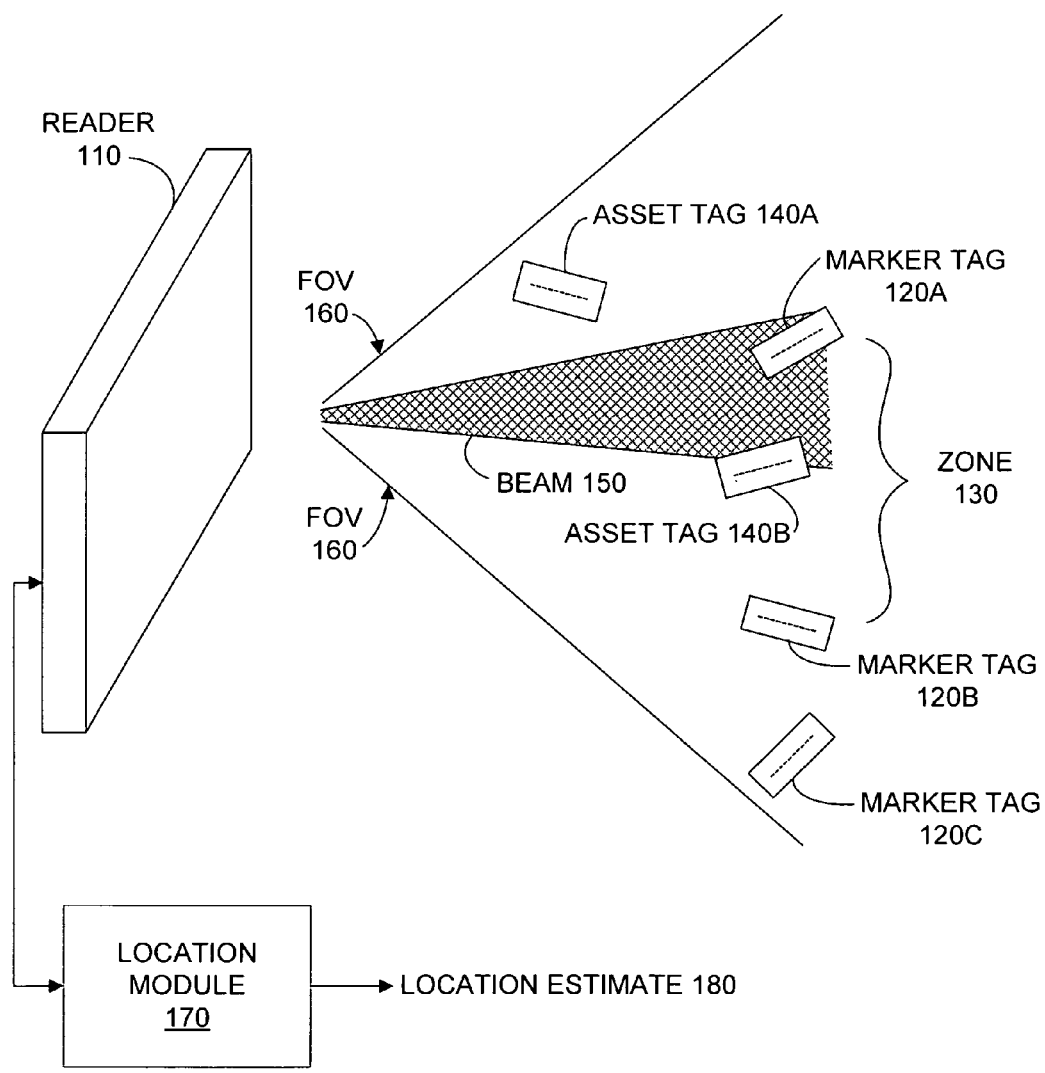
FIG. 1 illustrates a localizing system using marker tags and asset tags.

FIG. 1 illustrates a localizing system using marker tags and asset tags. The localizing system comprises a reader 110 and a location module 170. The reader 110 may generate a transmitted electromagnetic signal represented by beam 150. Field of view (FOV) 160 may represent the field of view for reception of the modulated backscatter signals received from marker tags 120 and/or asset tags 140. FOV 160 is shown in two-dimensions in FIG. 1 for simplicity, and may be a three-dimensional field of view. A zone 130 may be a region between marker tag 120A and marker tag 120B, as shown for simplicity in two dimensions in FIG. 1. As illustrated in FIG. 1, asset tag 140B falls within zone 130. In various embodiments, the zone 130 may also be a three dimensional region (not shown). Thus, one or more marker tags 120 may be used to define zones having two-dimensional and/or three-dimensional geometries.

In various embodiments, the reader 110 includes one or more antennas (not shown) for transmitting electromagnetic signals to the marker tags 120 and the asset tag 140, and one or more antennas for receiving the modulated backscatter signals from the marker tags 120 and the asset tag 140. The reader 110 may operate in one or more of the following modes: (i) single antenna transmission, multi-antenna reception; (ii) multi-antenna transmission, multi-antenna reception; and/or (iii) multi-antenna transmission, single antenna reception.

The marker tags 120 and asset tags 140 communicate with the reader 110 using modulated backscatter signals. Reader 110 receives modulated backscatter signals from the marker tags 120 and the asset tag 140, and estimates parameters of the modulated backscatter signals. As used herein, an estimated parameter of a modulated backscatter signal received from a marker tag 120 and/or an asset tag 140 includes any measurable quantity, characteristic, or information determined and/or estimated from the modulated backscatter signal.

An estimated parameter may include, but is not limited to, an RFID preamble, an RFID payload data and/or additional information, a signal strength of the modulated backscatter signal received from a marker tag 120 and/or an asset tag 140, an angle of arrival of the modulated backscatter signal received from a marker tag 120 and/or an asset tag 140, an antenna array response for a modulated backscatter signal received from a marker tag 120 and/or an asset tag 140, a range from a marker tag 120 and/or an asset tag 140 to the reader 110, a time of flight of the modulated backscatter signal from the marker tag 120 and/or asset tag 140 to the reader 110. When reader 110 estimates the parameters of the modulated backscatter signals over time, the location module 170 may determine a direction of motion of an asset tag 140 and/or a velocity of an asset tag 140.

The location of the marker tag 120 may be stored in a database (not shown) that is accessible to the location module 170. The location of the marker tag 120 may include an absolute or relative location in two-dimensional (x,y) coordinate space, or an absolute or relative location in three-dimensional (x,y,z) coordinate space.

The location module 170 may provide a location estimate 180 of the asset tag 140 by having reader 110 read (e.g., receive modulated backscatter signals) from one or more of the marker tags 120 and the asset tag 140 in the FOV 160 of reader 110. The location estimate 180 may be an absolute or a relative location estimate of the asset tag 140, may provide a determination that asset tag 140 is included in the zone 130, may provide a probabilistic estimate of the absolute or relative location of asset tag 140, and/or may provide a probabilistic estimate whether the asset tag 140 is included in the zone 130. For example, when the reader 110 reads asset tag 140B, the location module 170 may compare the location of asset tag 140B to the location of the marker tags 120A and 120B and provide the location estimate 180 including the determination that the zone 130 includes the asset tag 140B.

In various embodiments, the location module 170 may provide the location estimate 180 at multiple time instances and/or over multiple time periods. Thus, the location estimate 180 may be used to determine a direction of motion of the asset tag 140. This enables, for example, a reader 110 located at a doorway to determine whether an asset tag 140 may be entering or exiting a particular region of interest.

In various embodiments, marker tags 120 and/or asset tags 140 may be passive, semi-passive, active, or combinations of these kinds of tags. For example, some marker tags 120 may be semi-passive in order to provide a high spatial-resolution identification of zones, while asset tags 140 may be passive tags in order to reduce cost. If a range between reader 110 and the marker tags 120 and asset tags 140 is larger than suitable for passive tags, then both marker tags 120 and asset tags 140 may be semi-passive.

Once the location of an asset tag 140 has been estimated, the asset tag 140 can play the role of a marker tag 120, thus reducing the density of marker tags 120. An asset tag 140 used in this manner may be referred to as a simulated marker tag. A zone may thus be determined based on one or more simulated marker tags.

Figure 2:
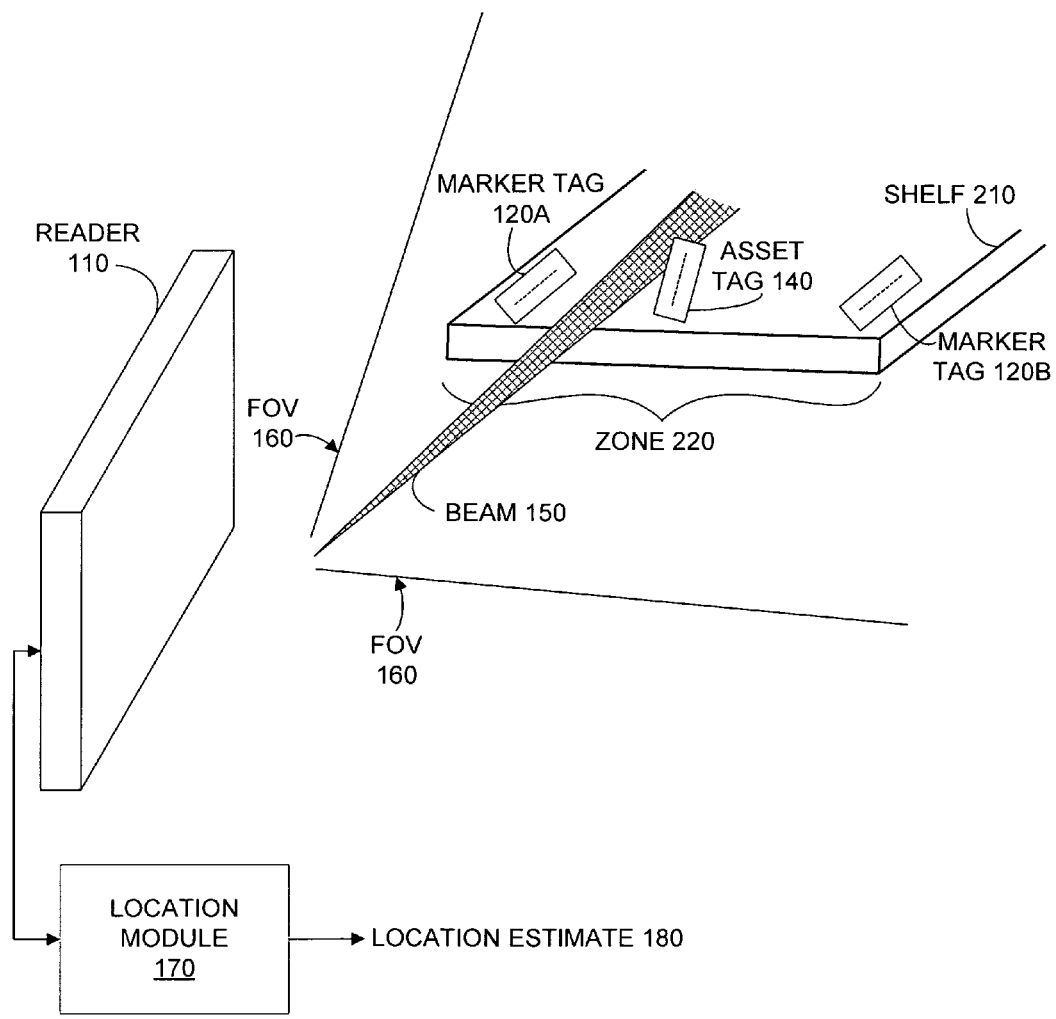
FIG. 2 illustrates a localizing system in a shelf application.

FIG. 2 illustrates a localizing system in a shelf application. The marker tag 120A may be positioned at one shelf end of shelf 210, and the marker tag 120B at the other end of shelf 210. A zone 220 may then be defined as the region on the shelf between the two marker tags 120A and 120B. In this application, the location module 170 may provide the location estimate 180 that includes whether the asset tag 140 is in the zone 220.

Figure 3:
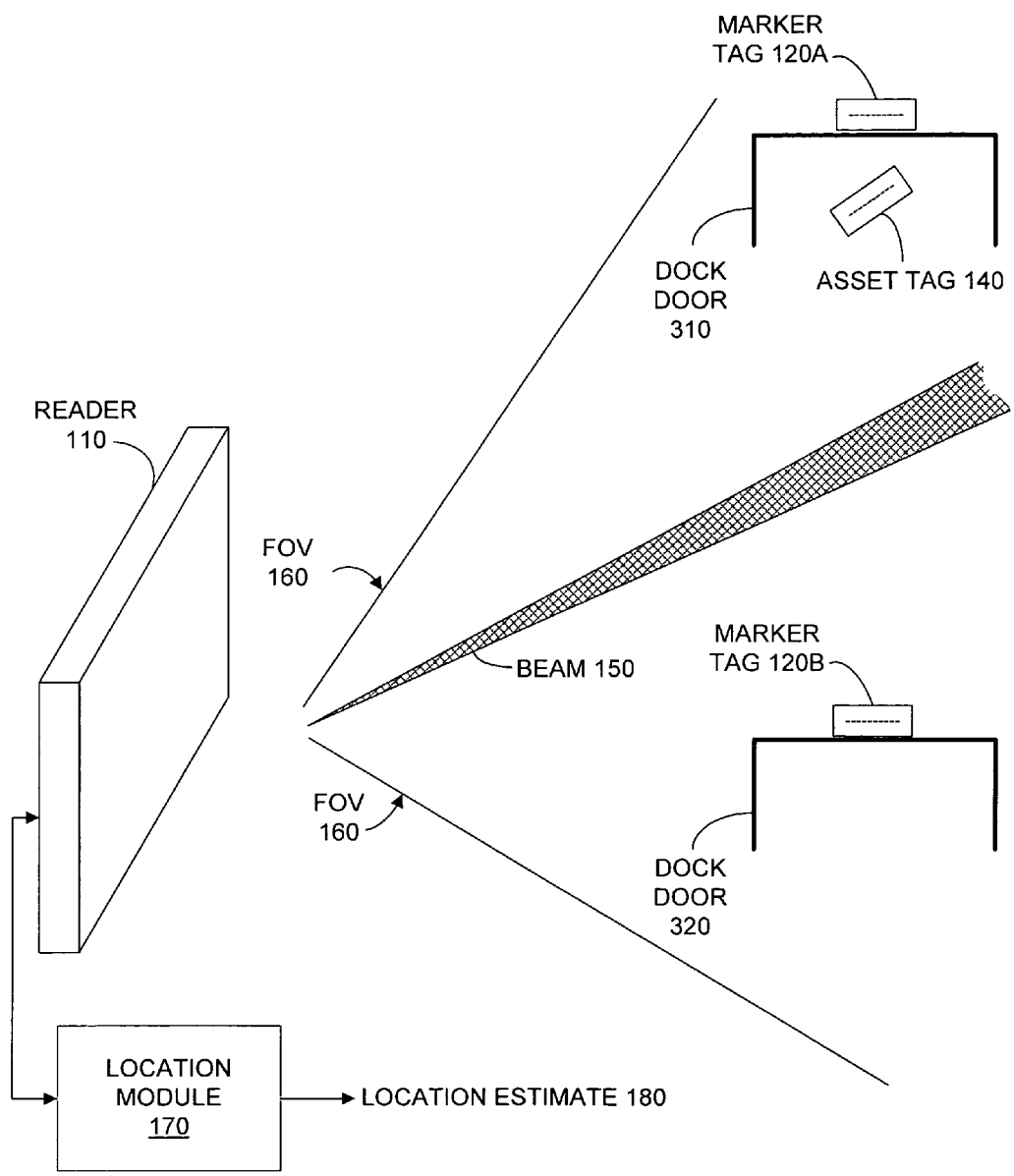
FIG. 3 illustrates a localizing system in a dock door application.

FIG. 3 illustrates a localizing system in a dock door application. In this application, a zone including dock door 310 may be defined by a radius from a marker tag 120A, and another zone including dock door 320 may be defined by a radius from a marker tag 120B. Although FIG. 3 illustrates a dock door application including two dock doors (dock door 310 and dock door 320), the localizing system may be used with a single dock door (not shown), or more than two dock doors (not shown).

The reader 110 may receive modulated backscatter signals from an asset tag 140 that is passing through dock door 310. Determining that the asset tag 140 is passing through dock door 310 may be based on a location estimate 180 that is within a radius from marker tag 120A.

Figure 4:
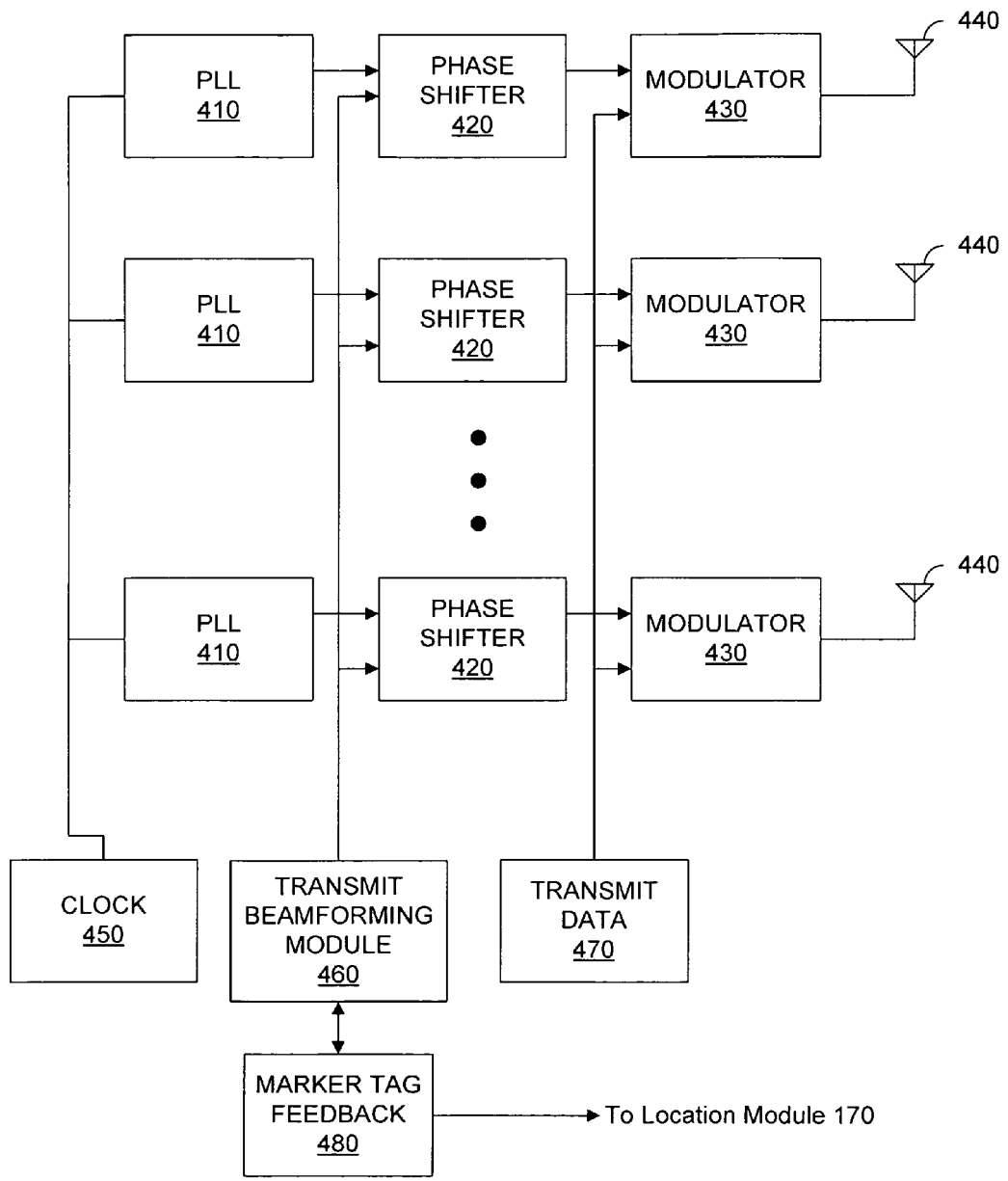
FIG. 4 is a block diagram of an exemplary transmitter beamforming system.

FIG. 4 is a block diagram of an exemplary transmitter beamforming system. The transmitter beamforming system comprises phase locked loops (PLL) 410, phase shifters 420, modulators 430, antennas 440, clock 450, transmit beamforming module 460, transmit data 470 and marker tag feedback 480. Each of the antennas 440 may be an individual antenna, or an antenna element. Transmitter beamforming uses two or more antennas 440 to direct the transmitted beam to a certain region in space. In various embodiments, reader 110 (FIG. 1) includes transmitter beamforming capability which enables reader 110 to select where to direct the energy of its beam 150.

In terms of the standard complex baseband representation for passband signals, if the transmitter beamforming system has N antenna elements, then the transmitted signal $u_i(t)$ from the ith antenna, i=1, . . . ,N, is given by $w_i s(t)$, where $w_i$ is a complex gain termed the ith beamforming coefficient, and s(t) is the signal (in general, complex-valued) to be transmitted. In a vector format, $$u(t)=(u_1(t), \ldots, u_N(t))^T,$$

$$w=(w_1, \ldots, w_N)^T, \text{ and}$$

$$u(t)=ws(t).$$

If the signal s(t) is narrowband (i.e., its bandwidth is small relative to the coherence bandwidth of the channel), then the channel gain from the ith transmit element to the marker tag 120 and/or asset tag 140 in such a system can be modeled as a complex scalar $h_i$. Defining the channel vector $$h=(h_1, \ldots, h_N)^T,$$

the received signal at the marker tag 120 and/or asset tag 140 can be modeled as:

$$y(t)=h^T w s(t)+n(t),$$

where n(t) denotes noise.

The modulated backscattered signal from the marker tag 120 and/or asset tag 140 therefore has power proportional to $(h^T w)^2$. The channel vector h depends on the location of the marker tag 120 and/or asset tag 140 relative to the antennas 440. For example, when antennas 440 are linear array with elements spaced by d, the channel vector for a marker tag 120 and/or asset tag 140 lying at an angle θ relative to the broadside is given by:

$$a(\theta)=(1,\alpha,\alpha^2, \ldots, \alpha^{N-1})^T,$$

where $\alpha=\exp(j2\pi d \sin\theta/\lambda)$, and λ denotes the carrier wavelength. Thus, the strength of the modulated backscatter signal from the marker tag 120 and/or asset tag 140 is related to the location of the marker tag 120 and/or asset tag 140 relative to the reader 110.

Using transmitter beamforming, the location module 170 may provide the location estimate 180 from the modulated backscatter signals as follows. A main lobe of the transmit beam, such as beam 150, may be scanned through a region. The beam 150 is electronically steered using an array of antennas 440 by controlling the relative phases and amplitudes of the radio frequency (RF) signals transmitted from the antennas 440. The strength of the received modulated backscatter signal from the marker tags 120 as a function of the scan angle may be provided to marker tag feedback 480 and to the localization module 170. Using this information the location estimate 180 including the angle of arrival of the modulated backscatter signals received from the marker tags 120 can be estimated.

The peak in the modulated backscatter signal strength as a function of the scan angle, for example, can be used to estimate parameters of the received modulated backscatter signal including the angle of arrival. For a high spatial-resolution estimate, suppose that $w_k$ is the vector of transmit beamforming coefficients corresponding to the kth scan, where k=1, . . . , K, and that h(x) is the channel vector from the reader 110 to a marker tag 120 and/or an asset tag 140 at location x relative to the reader 110. Here x may denote a three-dimensional position, a two-dimensional position, or an angle of arrival and/or departure relative to the transmit beamforming array of reader 110. The vector of received powers over the K scans is then proportional to:

$$Q(x)=((h(x)^T w_1)^2, \ldots, (h(x)^T w_K)^2).$$

A comparison of the actual vector of received powers $P=(P_1, \ldots, P_K)$ with Q(x) can therefore be used to estimate x from among a set of feasible values for x. For example, consider an array with array response a(θ). In order to form a beam towards angle $\theta_k$ on the kth scan, the beamforming coefficients are set to $w_k=a^*(\theta_k)$, so that the peak of $(h^T w_k)^2$ occurs at $h=a(\theta_k)$. The vector of expected receive powers from the marker tag 120 and/or the asset tag 140 at angle θ is therefore given by:

$$Q(\theta)=((a(\theta)^H a(\theta_1))^2, \ldots, (a(\theta)^H a(\theta_K))^2).$$

A comparison of the actual vector of received powers $P=(P_1, \ldots, P_K)$ with Q(θ) can now be used to estimate θ.

This technique generalizes to two-dimensional arrays, which enables the estimation of two angles. While angle estimation may be based on comparing the shape of P with Q(θ), the strength of P (the received signal strength) can be used to estimate the range of the marker tag 120 and/or the asset tag 140 relative to the reader 110. Thus, a two-dimensional transmit beamforming array can be used to estimate the three-dimensional location of a marker tag 120 and/or an asset tag 140 relative to the reader 110, by combining estimates of two angles and a range.

If the marker tag 120 transmits a modulated backscatter signal including a known data sequence, then a correlation against the sequence can be used to provide an estimate of the parameters of the received modulated backscatter signal. The modulated backscatter signal from a marker tag 120 and/or an asset tag 140 is also known as an uplink. The correlation can provide an estimate of the complex baseband channel gain, which is proportional to $h^T w$, and can be used for adaptation of the transmit beamforming coefficients w. For example, let sample y[l] correspond to the lth symbol, b[l], transmitted on the uplink. Then:

$$y[l]=b[l]\beta h^T w+N[l],$$

where N[l] denotes noise, and β is the overall complex gain seen on the uplink due to modulated backscatter from the marker tag 120 and/or the asset tag 140 and the propagation to reader 110. Then, the correlation $$\sum_l y[l] b*[l]$$

provides an estimate of $\beta h^T w$ which can be used to adapt w to maximize the gain $(h^T w)^2$.

This technique is an implicit feedback mechanism, since the reader 110 is extracting information about, and possibly adapting, the downlink based on information extracted from the uplink signal. Alternatively, if the data demodulation on the uplink is reliable enough, then this can be used for decision-directed parameter estimation by reader 110 to reduce the requirement for marker tag 120 to send a known segment of data. Thus, the symbols b[l] can be replaced by their estimates in such a decision-directed adaptation. The reader 110 could also estimate the average received power on the uplink by, for example, computing an average of $|y[l]|^2$. The parameter being estimated may include explicit feedback sent by the marker tag 120 to the reader 110. An example of explicit feedback is when the marker tag 120 encodes specific information regarding its received signal in the data that it is sending back in the modulated backscatter signal.

The reader 110 may also use transmitter beamforming to reduce interference between conventional RFID systems and/or other transmitter beamforming systems that may be in the same area. Using the marker tags 120, the reader 110 may use transmitter beamforming to direct the transmitted RF energy, such as beam 150, to desired areas and away from undesired areas using marker tag feedback 480 to control transmit beamforming module 460. The feedback from the marker tag 120 can be implicit or explicit, as discussed herein. Thus, transmitter beamforming and/or power control as described herein can reduce interference and thus accommodate multiple RFID systems and/or multiple readers 110 in close proximity.

Figure 5:
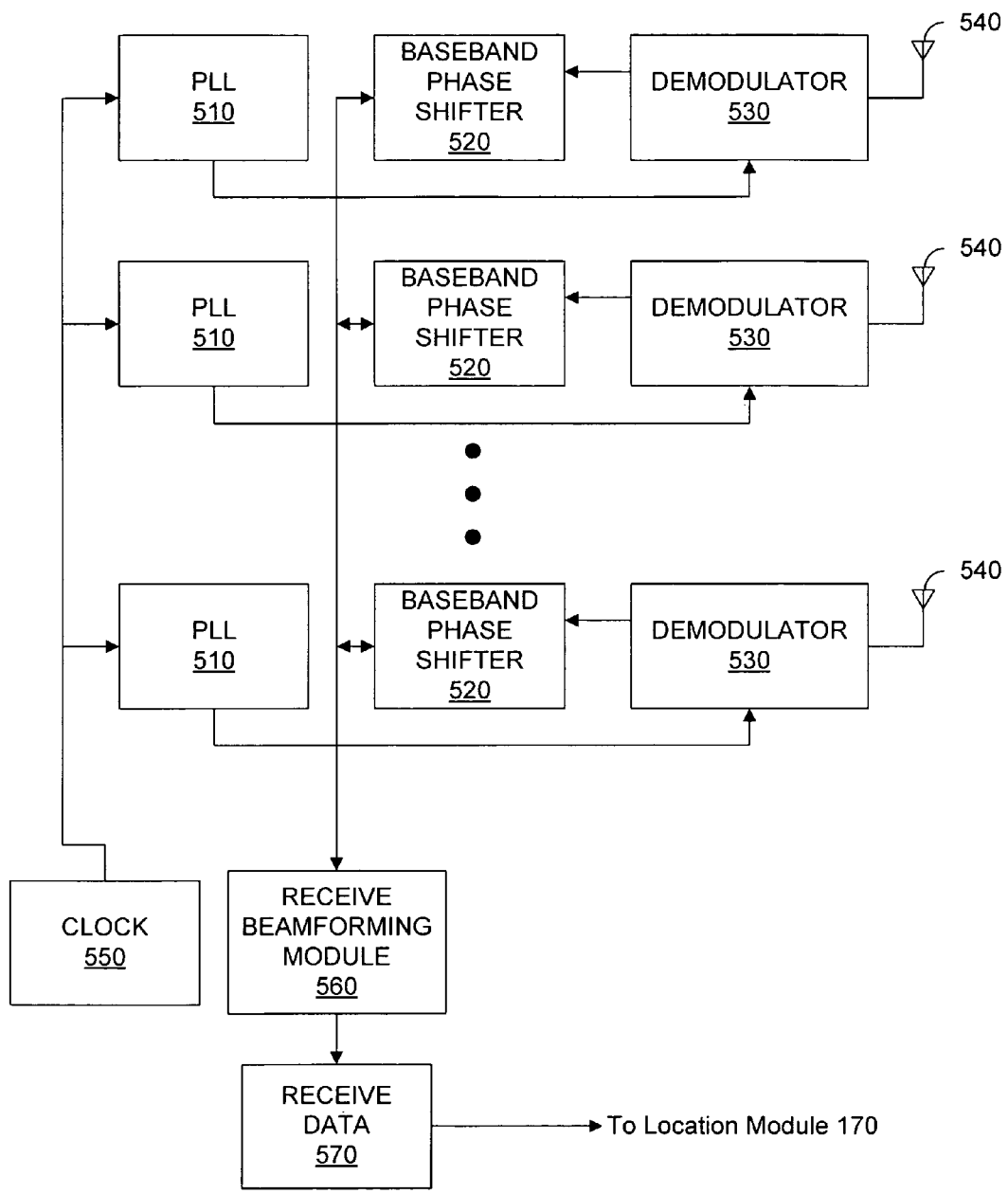
FIG. 5 is a block diagram of an exemplary receiver beamforming system.

FIG. 5 is a block diagram of an exemplary receiver beamforming system. The receiver beamforming system comprises phase locked loops (PLL) 510, baseband phase shifters 520, demodulators 530, antennas 540, clock 550, receive beamforming module 560 and receive data 570. Each of the antennas 540 may be an individual antenna, or an antenna element. Receiver beamforming may use two or more antennas 540 to tune the sensitivity of the reader 110 to a region in space, such as FOV 160. In various embodiments, the antennas 540 may be the same as the antennas 440 described with reference to FIG. 4. In various embodiments, reader 110 includes receive beamforming capability which enables reader 110 to determine localization information including an angle of arrival of the modulated backscatter signals received from the marker tags 120 and the asset tag 140.

Reader 110 may include receive beamforming implemented in baseband, as shown in FIG. 5. Using receiver beamforming, localizing asset tags 140 is based on the relationship between the modulated backscatter signals received at the antennas 540 from the one or more marker tags 120 and the asset tag 140. The receive beamforming module 560 can estimate the receive array response corresponding to the modulated backscatter signal from a marker tag 120 and/or an asset tag 140 by correlating the received signals at the antennas 540 against known or estimated data signals.

For example, consider narrowband signaling (in which the signal bandwidth is smaller than the channel coherence bandwidth) and a reader 110 with M antennas. Using the complex baseband representation for the passband received signals at the M antennas, the received signal for the jth antenna, where j=1, ..., M, can be written as $y_j(t)=h_j v(t)+n_j(t)$, where v(t) is the signal backscattered by the tag, $h_j$ is the complex channel gain from the tag to the jth antenna element, and $n_j(t)$ is the noise seen by the jth antenna element. Using the vector notation:

$$y(t)=(y_1(t),\ldots,y_M(t))^T,$$

$$h=(h_1,\ldots,h_M)^T,$$

$$n(t)=(n_1(t),\ldots,n_M(t))^T, \text{ then}$$

$$y(t)=hv(t)+n(t).$$

The vector h may be called the receive array response, or the spatial channel from the marker tag 120 and/or asset tag 140 to the reader 110.

It is also useful to consider a discrete-time mode of the preceding representation (possibly obtained by filtering and sampling the continuous-time vector signal y(t)), as follows:

$$y[l]=hb[l]+n[l],$$

where b[l] may denote the lth symbol transmitted on the uplink. A receiver beamforming system may form a spatial correlation of the vector received signal with complex-valued receive beamforming coefficients. Thus, let $w=(w_1,\ldots,w_M)^T$ denote a vector of complex-valued beamforming coefficients, or beamforming weights. Then a receiver beamforming system may form the inner-product:

$$r(t)=w^H y(t)=(w^H h)v(t)+w^H n(t).$$

For the discrete-time model, the corresponding inner product may follow the model:

$$r[l]=w^H y[l]=(w^H h)b[l]+w^H n[l].$$

An implementation of such a beamforming operation corresponds to phase shifts, implemented in baseband as shown in FIG. 5, as well as amplitude scaling (not shown).

In various embodiments, receive beamforming may be implemented in the RF band using a phase adjustment of the modulated backscatter signals received by individual elements of antennas 540, according to beamforming techniques known in the art. The beamforming coefficients w may be adapted by the receive beamforming module in order to track a desired signal of interest, which might, for example, be known symbols sent on the uplink by the tag. The values of the adapted weights provide information regarding the receive array response h. Alternatively, the receive beamforming module may estimate the receive array response h directly from y(t), for example, by correlating it against a set of known or estimated symbols. Another quantity of interest is the spatial covariance matrix C:

$$C=E[y(t)y^H(t)],$$

which can be estimated, for example, by summing or averaging the outer products $y[l]y^H[l]$.

The receive array response corresponding to the marker tag 120 and/or asset tag 140 can then be used by the location module 170 to provide the location estimate 180 for asset tag 140, according to techniques known in the art. The location module 170 may also use second order statistics, such as the spatial covariance matrix C. In typical RFID protocols, the data modulated by a conventional RFID tag includes a known preamble, followed by a payload that may include a tag identity and/or additional information. In various embodiments, the marker tag 120 and/or the asset tag 140 may use a known preamble to estimate the receive array response. In addition to the preamble provided by the RFID protocol, a larger training sequence that improves the estimation of the receive array response can be provided by explicitly configuring the payload to contain additional information including a known data segment. For example, for the discrete-time model:

$$y[l]=hb[l]+n[l],$$

the receive array response h may be estimated using the correlation $$\sum_l b*[l]y[l],$$

where the sequence of symbols b[l] is known a priori due to being part of a known preamble or training sequence, as discussed herein.

The receive beamforming module 560 may combine the signals received from antennas 540 using a combination of training and decision-directed adaptation according to techniques known in the art. For example, the receive beamforming module 560 may include adaptive algorithms known in the art based on the linear minimum mean squared error (MMSE) criterion. For example, for the discrete-time model:

$$r[l]=w^H y[l]=(w^H h)b[l]+w^H n[l],$$

the receive beamforming coefficients w may be adapted to minimize the mean squared error $E[|w^H y[l]-b[l]|^2]$. This can be implemented by algorithms that are known in the art, including least mean squares (LMS), recursive least squares (RLS) or block least squares (BLS), and/or variations thereof. If a marker tag 120 and/or asset tag 140 is communicating with the reader, and the noise is white, then the MMSE beamforming coefficients are a scalar multiple of h. Thus, adaptation of w provides information about the receive array response h. The beamforming coefficients w thus determined may be provided to the location module 170. The location module can also be provided with additional information such as the spatial covariance matrix C.

In various embodiments, reader 110 may perform data demodulation without using a receiver beamforming system such as illustrated in FIG. 5. In these embodiments, demodulation can be accomplished separately for each antenna (not shown) in an antenna array. Data demodulation can be performed first using one or more antennas, and then the decisions can be correlated against the received signals at the different antenna elements to estimate the receive array response. For example, for the discrete-time model:

$$y[l]=hb[l]+n[l],$$

a decision-directed estimation of h may estimate the receive array response h using the correlation $$\sum_l b*[l]y[l],$$

where the estimates of the symbols b[l] are obtained from demodulators.

As described herein, the receiver array response h may be estimated by various methods including direct estimation by correlation of the vector received modulated backscatter signal against known or estimated signals, and indirect estimation by adapting receive beamforming weights w. Estimates of the receive array response may be used by the location module 170 to provide the location estimate 180 for the marker tag 120 and/or asset tag 140, relative to the reader 110, since the receive array response h depends on the location of the marker tag 120 and/or asset tag 140 relative to the antennas 540 in the receive antenna array.

For example, when antennas 540 are a linear array with elements spaced by d, the channel vector for a marker tag 120 and/or asset tag 140 at an angle θ relative to the broadside is given by:

$$a(\theta)=(1,\alpha,\alpha^2,\ldots,\alpha^{N-1})^T,$$

where $\alpha=\exp(j2\pi d \sin \theta/\lambda)$ and λ denotes the carrier wavelength. For a line of sight (LOS) link between the antennas 540 and the marker tag 120 and/or asset tag 140, the direction in which the marker tag 120 and/or asset tag 140 lies, relative to the current position of the antennas 540, can be estimated by maximizing $|a^H(\theta)h|$ as a function of θ over its permissible range. For an embodiment where antennas 540 are a two-dimensional antenna array, two angles may be estimated. Furthermore, the received signal strength can be used to estimate the range, which then enables three-dimensional location. Other techniques known in the art for estimating the range can also be used, such as using frequency modulated continuous wave (FMCW) waveforms.

Once the location of the marker tags 120 and/or asset tag 140 relative to the reader 110 have been determined by the location module 170, a comparison of these locations can be used to determine the location estimate 180 of the asset tag 140 relative to the marker tags 120. Thus, if the absolute location of the marker tags 120 is known, then the absolute location of the asset tag 140 can be determined. Alternatively, the location module 170 may compare location-related parameters such as transmit or receive beamforming coefficients, or estimates of the receive array response, in order to provide the location estimate 180 for the asset tag 140 relative to the marker tags 120. Such a location estimate 180 may be quantized to a zone, as described herein, instead of being an explicit estimate in a two-dimensional or three-dimensional coordinate system. As discussed with reference to FIG. 1, FIG. 2 and FIG. 3, a zone may be defined as a region around one or more marker tags 120, without requiring that the absolute coordinates of the marker tags are known.

If the antennas 440 described with reference to FIG. 4 and the antennas 540 described with reference to FIG. 5 are the same antenna array, the beamforming coefficients determined by receive beamforming module 560 may be used for transmission by transmit beamforming module 460, thereby directing beam 150 more precisely to the region of a marker tag 120 and/or an asset tag 140. Alternatively, to reduce interference from marker tags 120 in a particular region, the transmit beamforming module 460 may synthesize a null in the direction of particular marker tags 120 by adapting the transmit beamforming coefficients to be near-orthogonal to the receive beamforming coefficients.

A reader 110 including transmitter and/or receiver beamforming may provide improved performance by using space division multiple access (SDMA) methods known in the art. For example, reader 110 can direct its transmitted energy in beam 150 to a small region, thereby reducing the number of marker tags 120 that are illuminated by beam 150. In various embodiments, the use of SDMA may simplify the task of singulation. For a reader 110 including receive beamforming, multiuser detection techniques and algorithms such as MUSIC can be used to successfully decode simultaneous responses from multiple marker tags 120 based on the differences in their receive array responses. Furthermore, if the marker tag 120 payload includes data encoded in a direct sequence spread spectrum format, then multiple tags may be read at the same time by employing code division multiple access (CDMA) techniques known in the art to successfully decode multiple responses by received by reader 110. In a reader 110 with receiver beamforming capabilities, such CDMA techniques can be used in conjunction with SDMA.

Reader 110 may also be used to determine range estimates. The geometry for a reader 110 is analogous to radar and/or sonar since the modulated backscatter signals from marker tags 120 and asset tags 140 are electronically reflected back to reader 110. Therefore, according to methods known in the art, radar and/or sonar techniques can be used to estimate range information. For example, the reader 110 can transmit beam 150 including a frequency modulated continuous wave (FMCW) waveform instead of a continuous wave (CW) tone, and can process the return from the marker tag 120 and/or asset tag 140 to detect the frequency difference between the transmitted FMCW waveform and the received FMCW waveform, and thereby estimate the range as may be done in FMCW radar. Reader 110 may be used to determine range information using the strength of a modulated backscatter signal received from a marker tag 120 and/or an asset tag 140.

Figure 6:
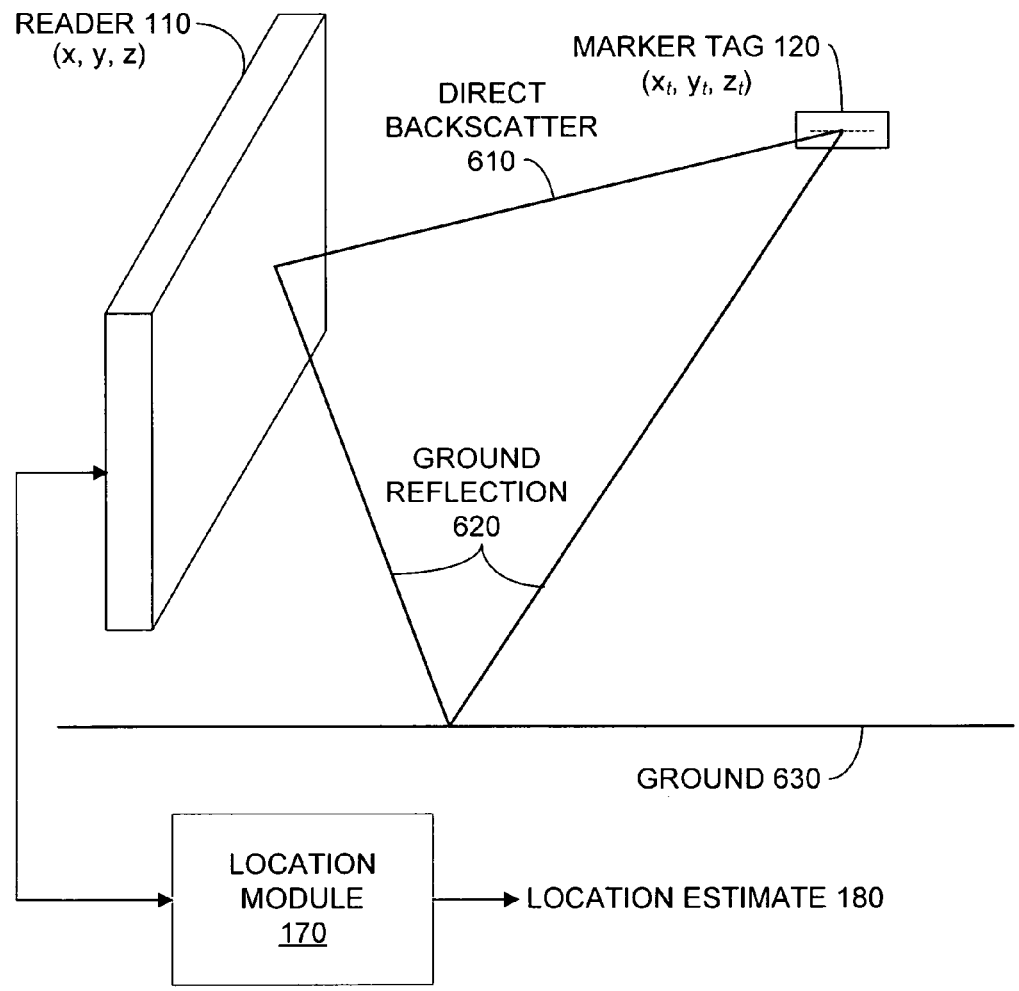
FIG. 6 illustrates a localizing system in a multipath environment.

FIG. 6 illustrates a localizing system in a multipath environment. Reader 110 and location module 170 may localize marker tags 120 and/or asset tags 140 in the presence of multipath components from reflecting or scattering objects. One such reflecting or scattering object is a ground surface. As illustrated in FIG. 6, a multipath environment may include reader 110 at a location (x,y,z), ground 630, a marker tag 120 at location $(x_t, y_t, z_t)$. The reader 110 receives direct backscatter 610 from marker tag 120, and ground reflection 620.

In a simple line of sight (LOS) environment without a ground reflection 620, a maximum likelihood (ML) estimate of the location of the marker tag 120 and/or the asset tag 140 corresponds to maximizing the correlation of the received array response against the array manifold. However, for a multipath environment, the ML estimate depends on the geometry. In one example, a dominant multipath component may be the ground reflection 620 reflected from ground 630. Other reflecting or scattering objects between the reader 110 and marker tag 120 and/or asset tag 140 may also produce multipath components.

The complex baseband received array response corresponding to the multipath environment illustrated in FIG. 6 may be modeled by:

$$h = \alpha_1 a_1(x_t, y_t, z_t) + \alpha_2 a_2(x_t, y_t, z_t) + N$$

where $a_1$ is the array response corresponding to the direct backscatter 610 (LOS path), $a_2$ is the array response corresponding to path from the ground reflection 620, $\alpha_1, \alpha_2$ are complex gains corresponding to these paths and depend on the propagation environment, and may be unknown, and N is noise. The receive array response h above may denote an estimate of the receive array response, obtained using one of the techniques discussed herein, and the noise N may be interpreted as estimation noise, which is typically well approximated as white and Gaussian.

One approach to modeling these complex gains is to obtain a joint ML estimate of the complex gains and the location of marker tag 120, $(x_t, y_t, z_t)$, by performing the minimization:

$$\min_{\alpha_1, \alpha_2} \min_{(x_t, y_t, z_t)} (y - \alpha_1 a_1(x_t, y_t, z_t) + \alpha_2 a_2(x_t, y_t, z_t))^H (y - \alpha_1 a_1(x_t, y_t, z_t) + \alpha_2 a_2(x_t, y_t, z_t))$$

where H is the conjugate transpose and the minimization is optimal when the noise, N, is additive white Gaussian.

One solution known in the art is to choose a location of marker tag 120 $(x_t, y_t, z_t)$ that minimizes the projection of y orthogonal to the subspace spanned by $a_1(x_t, y_t, z_t)$ and $a_2(x_t, y_t, z_t)$. The search for the best estimate of the location $(x_t, y_t, z_t)$ can be constrained further based on additional information (e.g., range estimates, or prior knowledge of the distance of the reader 110 from the location estimate of the marker tag 120.)

Other solutions known in the art include use of algorithms such as MUSIC or ESPRIT for finding the dominant multipath components, based on the spatial correlation matrix. In general, finding the best fit location for marker tag 120 for a particular receive array response can be achieved using standard ML or Bayesian techniques that take into account models of the multipath environment.

For a rich scattering environment, where the multipath is not sparse enough to model as described herein, the dependence of the receive array response for the location of marker tag 120 may not be correctly modeled as described herein. However, the received array response still varies smoothly with the location of marker tag 120. Thus, if one or more marker-tags 120 are placed densely enough, then a comparison of the array response for an asset tag 140 (FIG. 1) with those of marker tags 120 (e.g., by computing the normalized correlation between the estimated parameters) can be used to estimate the location of the asset tag 140. If $h_a$ and $h_b$ are the estimated receive array responses for tags a and b, then the normalized correlation may be defined as:

$$\frac{|h_a^H h_b|}{\sqrt{(h_a^H h_a)(h_b^H h_b)}}.$$

For example, if the received array response is highly correlated with those for the marker tags 120 on a shelf 210 (FIG. 2), as determined by a clustering algorithm, then one would estimate that the asset tag 140 is on the shelf 210.

Figure 7:
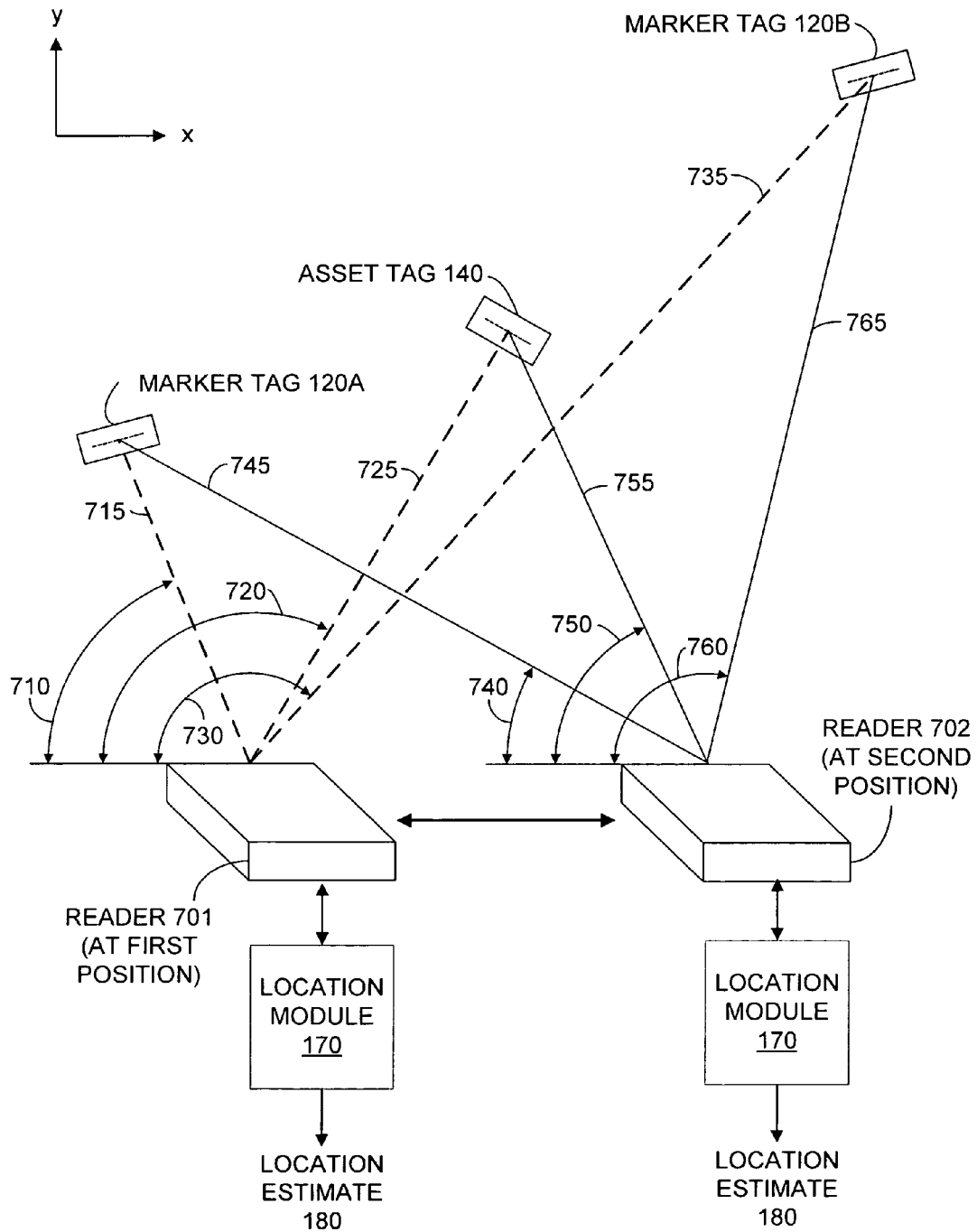
FIG. 7 illustrates a localizing system in a two-dimensional mobile reader configuration.

FIG. 7 illustrates a localizing system in a two-dimensional mobile reader configuration. In various embodiments, the reader 701 may be mobile, i.e., the reader 701 may be moved from a first position to a second position (indicated as reader 702). A mobile reader configuration may used to take an inventory of asset tags 140 over an entire store.

In the mobile configuration, reader 110 may receive modulated backscatter signals from a plurality of marker tags 120 and an asset tag 140 using a reader 701, where reader 701 is an embodiment of reader 110 at the first position. Then, the reader 702 may receive modulated backscatter signals from the plurality of marker tags 120 and the asset tag 140, where reader 702 is an embodiment of reader 110 at the second position.

As illustrated in FIG. 7, an angle 710 may be defined as an angle between the marker tag 120A and an axis of reader 701. Likewise, an angle 720 may be defined between the asset tag 140 and the axis of reader 701, and an angle 730 may be defined as an angle between the marker tag 120B and the axis of reader 501. Range 715 is defined as the distance between the marker tag 120A and the reader 701. Likewise, range 725 is defined as the distance between the asset tag 140 and the reader 701, and range 735 is defined as the distance between the marker tag 120B and the reader 701.

Similarly, angles 740 and 760 may be defined from the marker tags 120A and 120B, respectively, and the axis of reader 702. Angle 750 may be defined from the asset tag 140 and the axis of reader 702. Likewise, ranges 745 and 765 may be defined from the marker tags 120A and 120B, respectively, and the reader 702. Range 755 may be defined as the distance from asset tag 140 and reader 702.

In one embodiment, estimated parameters of the modulated backscatter signals received from marker tags 120A and 120B include the angles 710 and 730 (with respect to the axis of reader 701), and angles 740 and 760 (with respect to the axis of reader 702). In this embodiment, the estimated parameters of the modulated backscatter signals received from the asset tag 140 include the angles 720 and 750.

Since the positions of the marker tags 120A and 120B are known, the location module 170 may provide the location estimate 180 for the asset tag 140 using the locations of marker tags 120A and 120B, the angles 710, 720, 730, 740, 750, 760, and geometry, by first estimating the locations of the reader 701 and the reader 702. The location of the reader 701 can be estimated using the locations of the marker tags 120A and 120B, the angles 710 and 730, and simple geometric calculations. The location of the reader 702 can likewise be estimated.

The location module 170 may provide the location estimate 180 for the asset tag 140 as follows: denote $(x_1,y_1)$ the location of marker tag 120A, $(x_2,y_2)$ the location of marker tag 120B, $\theta_1$ the angle 730, and $\theta_2$ the angle 710. Then, the location $(a_1,b_1)$ of reader 701 can be estimated by solving the following equations:

$$\frac{y_1 - b_1}{a_1 - x_1} = \tan\theta_1, \frac{y_2 - b_1}{x_2 - a_1} = \tan\theta_2.$$

The location module 170 may estimate the location of the reader 702 using the locations of the marker tags 120A and 120B, the angles 740 and 760, and similar geometric calculations.

Subsequently, the location of the asset tag 140 may be estimated using the estimates of the locations of the readers 701 and 702, the angles 720 and 750, and similar geometric calculations. Although FIG. 7 is shown in two dimensions for simplicity, the location of the asset tag 140, reader 701 and reader 702 may also be estimated in three dimensions using similar geometrical calculations generalized to three-dimensions.

In various embodiments, estimated parameters of the modulated backscatter signals received from marker tags 120A and 120B include the ranges 715 and 735 (to reader 701) and ranges 745 and 765 (to reader 702). In these embodiments, the estimated parameters of the modulated backscatter signals received from the asset tag 140 include the ranges 725 and 755.

Since the positions of the marker tags 120A and 120B are known, the location module 170 may provide the location estimate 180 for the asset tag 140 using, for example, the locations of marker tags 120A and 120B, the ranges 715, 725, 735, 745, 755, 765, and geometry. By first estimating the locations of the reader 701 and the reader 702, the location of the asset tag 140 may be estimated. The location of the reader 701 can be estimated using the locations of the marker tags 120A and 120B, the ranges 715 and 735, and geometric calculations. The location of the reader 701 may be likewise estimated.

The location module 170 may estimate the location of an asset tag 140 as follows: denote by $(x_1,y_1)$ the location of marker tag 120A, $(x_2,y_2)$ the location of marker tag 120B, $r_1$ the range 715, and $r_2$ the range 735. Then, the location $(a_1,b_1)$ of reader 701 can be estimated by solving the following equations:

$$(a_1-x_1)^2+(b_1-y_1)^2=r_1^2, (a_1-x_2)^2+(b_1-y_2)^2=r_2^2.$$

There are two possible solutions, corresponding to the two intersections of circles of radius $r_1$ and $r_2$ centered at the marker tags 120A and 120B, respectively. (If the circles do not intersect, then there is no solution to the preceding equation.) The solution that corresponds to the location of the reader 701 can be determined based on, for example, by knowing which side of the marker tags 120A and 120B the reader 110 is on.

The location module may estimate the location of the reader 702 using the locations of the marker tags 120A and 120B, the ranges 745 and 765, and similar geometric calculations. Subsequently, the location estimate 180 of the asset tag 140 may be estimated using the estimates of the locations of the readers 701 and 702, the ranges 725 and 755, and similar geometric calculations. The location of the asset tag 140, reader 701 and 702 may also be estimated in three dimensions using geometry.

In various embodiments, the estimated parameters of the modulated backscatter signals received from marker tags 120 and/or asset tag 140 are received array responses. In an environment with multipath propagation, location module 170 may provide the location estimate 180 for the marker tags 120 and/or asset tag 140 using the received array responses and may use prior knowledge of, or models of, the multipath environment. For example, if the multipath environment consists primarily of a line-of-sight path and a ground reflection, as illustrated in FIG. 6, then a ML or Bayesian approach may be used for estimating the locations of the reader 110 (e.g., reader 701 and reader 702), marker tags 120 and asset tag 140 by taking into account the complex gains associated with each path.

The embodiments discussed herein are illustrative of the present invention. As these embodiments are described with reference to illustrations, various modifications or adaptations of the specific elements or methods described may become apparent to those skilled in the art. All such modifications, adaptations, or variations that rely on the teachings of the present invention, and through which these teachings have advanced the art, are considered to be in the spirit and scope of the present invention. Hence, these descriptions and drawings should not be considered in a limiting sense, as it is understood that the present invention is in no way limited only to the embodiments illustrated.

The invention claimed is:

1. A method, comprising:
   scanning, from a reader having one or more antennas, an electromagnetic signal across a zone, the zone formed between a plurality of marker tags located in an area proximate to the reader;
   affixing an asset tag to an asset; and
   determining a location estimate of the asset tag based on parameters of backscatter signals, the backscatter signals received by the reader from the asset tag and the plurality of marker tags;
   wherein the location estimate includes a determination of whether the asset tag is positioned within the zone formed by the plurality of marker tags;
   and wherein the parameters of the backscatter signals include an angle of arrival, a range from the reader to at least one of the plurality of marker tags, and a range from the reader to the asset tag;
   wherein the angle of arrival of the backscatter signals is determined based on a peak received signal strength of the backscatter signals as a function of a scan angle of the scanned electromagnetic signal; and
   wherein the range from the reader to the at least one of the plurality of marker tags and the range from the reader to the asset tag are determined based on comparing shapes of vectors of received powers with vectors of expected powers.

2. The method of claim 1 further comprising determining a direction of motion of the asset tag.

3. The method of claim 1 wherein the reader comprises a receive beamforming array including a plurality of antenna elements configured to receive the backscatter signals from the plurality of marker tags and from the asset tag.

4. The method of claim 3 wherein said received backscatter signals comprise a received array response corresponding to direct backscatter and another received array response corresponding to multipath reflection or scattering.

5. The method of claim 4 wherein a clustering algorithm is used on said received array responses in determining said location estimate.

6. The method of claim 4 wherein a multiple signal classification (MUSIC) algorithm is used on said received array responses in determining said location estimate.

7. The method of claim 4 wherein a rotational invariance (ESPRIT) algorithm is used on said received array responses in determining said location estimate.

8. The method of claim 1 further comprising using the location estimate of said asset tag by said reader to utilize said asset tag as a simulated marker tag.

9. A method, comprising:
   (a) positioning a reader at a first stationary location;
   (b) scanning, by said reader, a transmit beam through a scan angle from a transmitter beamscanning system across a zone using an array of antennas, said transmit beam comprising radio frequency (RF) signals emitted from said array of antennas, said zone formed between a plurality of marker tags located in an area proximate to the reader;
   (c) affixing an asset tag to an asset;
   (d) receiving, by said reader, backscatter signals from at least one marker tag and the asset tag;
   (e) determining a location estimate of the asset tag based on parameters of backscatter signals, the backscatter signals received by the reader from the asset tag and the plurality of marker tags, wherein the location estimate includes a determination of whether the asset tag is positioned within the zone formed by the plurality of marker tags, and wherein the parameters of the backscatter signals include an angle of arrival, a range from the reader to at least one of the plurality of marker tags, and a range from the reader to the asset tag, wherein the angle of arrival of the backscatter signals is determined based on a peak received signal strength of the backscatter signals as a function of the scan angle, and wherein the range from the reader to the at least one of the plurality of marker tags and the range from the reader to the asset tag are determined based on comparing shapes of vectors of received powers with vectors of expected powers; and
   (f) moving the reader to a second stationary position and repeating steps (b)-(e) at the second stationary position.

10. The method of claim 9 wherein the reader comprises a receive beamforming array including a plurality of antennas configured to receive the backscatter signals from at least one of the plurality of marker tags and the backscatter signals from the asset tag.

11. The method of claim 9 wherein the location estimate of the asset tag comprises a probabilistic estimate of an absolute or relative location of the asset tag.

12. A system, comprising:
   a plurality of marker tags;
   a reader having one or more antennas for scanning an electromagnetic signal across a zone, the zone formed between the plurality of marker tags;
   an asset tag affixed to an asset; and
   a location module configured to determine a location estimate of the asset tag, wherein the location estimate is based on parameters of backscatter signals received by the reader from the asset tag and the plurality of marker tags;
   wherein the location estimate includes a determination of whether the asset tag is positioned within the zone formed by the plurality of marker tags;
   wherein the parameters of the backscatter signals include an angle of arrival, a range from the reader to at least one of the plurality of marker tags, and a range from the reader to the asset tag;
   wherein the angle of arrival of the backscatter signals is determined based on a peak received signal strength of the backscatter signals as a function of a scan angle of the scanned electromagnetic signal; and
   wherein the range from the reader to the at least one of the plurality of marker tags and the range from the reader to the asset tag are determined based on comparing shapes of vectors of received powers with vectors of expected powers.

13. The system of claim 12 wherein the location estimate includes a probabilistic estimate of an absolute or relative location of the asset tag.

14. The system of claim 12 wherein the location module is further configured to determine a direction of motion of the asset tag.

* * * * *